United States Patent
Harrington

(10) Patent No.: US 10,168,000 B2
(45) Date of Patent: Jan. 1, 2019

(54) NITROGEN PUMPING FROM A TANK TRUCK

(71) Applicant: Air Liquide Large Industries U.S. LP, Houston, TX (US)

(72) Inventor: Jeff Harrington, Pearland, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 265 days.

(21) Appl. No.: 15/139,422

(22) Filed: Apr. 27, 2016

(65) Prior Publication Data

US 2017/0314736 A1    Nov. 2, 2017

(51) Int. Cl.

| | |
|---|---|
| *F17C 9/02* | (2006.01) |
| *F04B 17/05* | (2006.01) |
| *F04B 53/14* | (2006.01) |
| *F04B 1/16* | (2006.01) |
| *F17C 13/00* | (2006.01) |
| *B60W 30/188* | (2012.01) |
| *F02D 41/02* | (2006.01) |
| *F02D 31/00* | (2006.01) |
| *F16H 61/00* | (2006.01) |

(52) U.S. Cl.
CPC .......... *F17C 9/02* (2013.01); *B60W 30/1888* (2013.01); *F02D 31/001* (2013.01); *F02D 41/021* (2013.01); *F04B 1/16* (2013.01); *F04B 17/05* (2013.01); *F04B 53/14* (2013.01); *F17C 13/004* (2013.01); *F16H 2061/0012* (2013.01); *F17C 2221/014* (2013.01); *F17C 2227/0135* (2013.01)

(58) Field of Classification Search
CPC ...... F17C 9/02; F17C 9/04; F17C 7/02; F17C 7/04; F16H 2061/002
See application file for complete search history.

(56) References Cited

U.S. PATENT DOCUMENTS

| | | | | |
|---|---|---|---|---|
| 4,738,115 A | * | 4/1988 | Goode | F17C 9/02 60/618 |
| 5,327,732 A | * | 7/1994 | De Almeida | A62C 3/0207 169/69 |
| 2015/0219280 A1 | * | 8/2015 | Braithwaite | F25J 1/0015 62/48.3 |

* cited by examiner

*Primary Examiner* — Brian King
(74) *Attorney, Agent, or Firm* — Elwood L. Haynes

(57) ABSTRACT

A method of pumping a liquid with a tank truck, power is transferred from a diesel engine through a automatic transmission device to a triplex pump, wherein the triplex pump has a fluid provided to an inlet, an fluid outlet pressure and a fluid outlet flow rate, the diesel engine has a rotational speed, and the automatic transmission has an outlet rotational speed, and has multiple gear ratios is provided. The method comprising determining a delta P by comparing the fluid outlet pressure of the triplex pump to a predetermined pressure, determining a delta F by comparing the fluid outlet flow rate of the triplex pump to a predetermined flow rate, adjusting the rotational speed of the diesel engine to reduce the delta P and delta F, wherein the rotational speed of the diesel engine is held constant once either the delta P or the Delta F is approximately zero.

7 Claims, 4 Drawing Sheets

NITROGEN PUMPING FROM A TANK TRUCK

BACKGROUND

High purity nitrogen is normally obtained by cryogenic means. For small consumptions, the construction of a self-contained known production unit represents a prohibitive investment, in the case of automated installations, and a more limited investment but with high labor expenses in the opposite case which always represents a high cost for the nitrogen produced.

A more economical solution consists in utilizing a container for liquid nitrogen with large capacity, for example many tens of thousands of liters, from which liquid nitrogen is withdrawn and vaporized. As this is often an around the clock field operation, it is very demanding on the operator, who often must function as a repair man and field engineer as well. There is a need in the industry for a fully automated trailer truck mounted liquid nitrogen vaporizer, such as that proposed herein.

SUMMARY

In one embodiment of the present invention, a method of pumping a liquid with a vehicle tank truck, comprising; a diesel engine, an automatic transmission device, and a triplex pump, wherein power is transferred from the diesel engine through the automatic transmission device to the triplex pump, wherein the triplex pump has a fluid provided to an inlet, an fluid outlet pressure and a fluid outlet flow rate, the diesel engine has a rotational speed, and the automatic transmission has an outlet rotational speed, and has multiple gear ratios is provided. The method comprising determining a delta P by comparing the fluid outlet pressure of the triplex pump to a predetermined pressure, determining a delta F by comparing the fluid outlet flow rate of the triplex pump to a predetermined flow rate, adjusting the rotational speed of the diesel engine to reduce the delta P and delta F, wherein the rotational speed of the diesel engine is held constant once either the delta P or the Delta F is approximately zero, and increasing the gear ratio of the automatic transmission if the rational speed of the diesel engine reaches a predetermined maximum, and decreasing the gear ratio of the automatic transmission if the rotational speed of the diesel engine reaches a predetermined minimum. The fluid may be liquid nitrogen.

In another embodiment of the present invention, a method for producing vaporized nitrogen from a liquid nitrogen vehicle tank truck, utilizing the above method is provided. This method comprising: introducing the liquid nitrogen into said triplex pump, thereby producing a pressurized liquid nitrogen stream, providing the pressurized liquid nitrogen stream to at least one of the following: a downstream liquid nitrogen customer, a fired vaporizer, and a waste heat vaporizer.

The method may include a manual selector, for providing power to a transfer case when the manual selector is in a first position, and providing power to a set of drive wheels when the manual selector is in a second position, wherein, when in the first position, the transfer case provides power from the automatic transmission device to the triplex pump.

The method may include a transfer case is configured for: providing power to the triplex pump form a first power outlet, and providing power to a hydraulic pump from a second power outlet. In this method, the liquid nitrogen may be provided by a storage tank. The storage tank may be mounted on a separate truck.

With this method, the pressurized liquid nitrogen stream may produce a vaporized nitrogen stream upon exiting the fired vaporizer or the waste heat vaporizer. The vaporized nitrogen may be at approximately ambient temperature. The vaporized nitrogen may be at a temperature of between 32 degrees F. and 100 degrees F. The vaporized nitrogen may be at a temperature of between 60 degrees f and 80 degrees F.

The vaporized nitrogen may be at less than ambient temperature. The vaporized nitrogen may be at a temperature of between 32 degrees F. and −320 degrees F. the vaporized nitrogen may be at a temperature of between −238 degrees F. and −320 degrees F.

The vaporized nitrogen may be at greater than ambient temperature. The vaporized nitrogen may be at a temperature of between 100 degrees F. and 700 degrees F. The vaporized nitrogen may be at a temperature of between 250 degrees F. and 650 degrees F.

The vaporized nitrogen stream may have a flow rate of between 2,000 and 10,000 scfm. The vaporized nitrogen may have a flow rate of less than 11,000 scfm. The vaporized nitrogen may have a pressure of between 2,000 and 10,000 psig.

DESCRIPTION OF PREFERRED EMBODIMENTS

Figure 1:
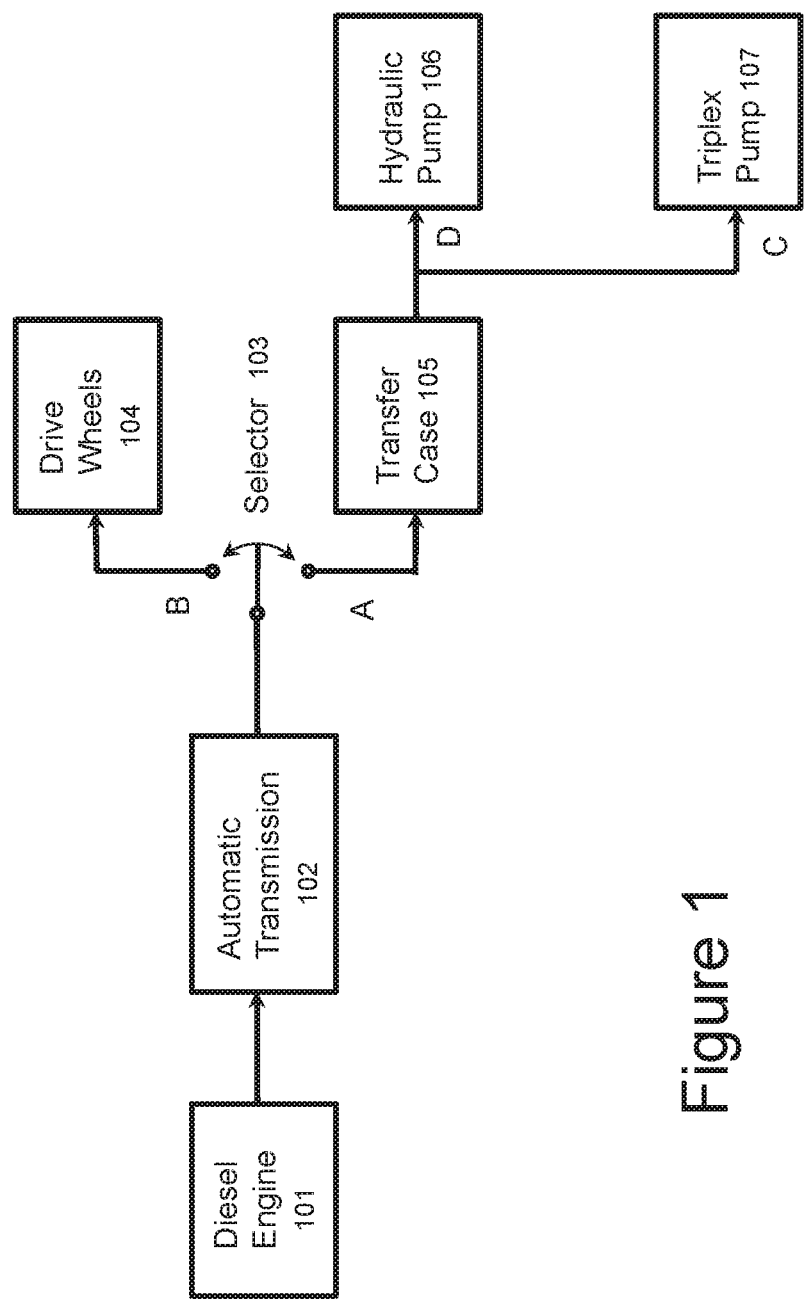
FIG. 1 the basic overall scheme, in accordance with one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIGURE ELEMENTS

101=diesel engine
102=automatic transmission

103=selector
104=drive wheels
105=transfer case
106=hydraulic pump
107=triplex pump
201=diesel engine output speed
202=automatic transmission output speed
210=automatic transmission gears
301=liquid nitrogen tank
302=liquid nitrogen boost pump
303=boost pump pressure indicator
305=triplex pump outlet pressure indicator
306=triplex pump outlet flow indicator
307=programmable logic controller (PLC)
308=liquid nitrogen to customer
309=diesel fired nitrogen vaporizer
310=diesel vaporizer tempering line
311=waste heat nitrogen vaporizer
312=waste heat vaporizer tempering line
313=sub-ambient or super-ambient vaporized nitrogen to customer
314=ambient vaporized nitrogen to customer
315=triplex pump inlet
316=triplex pump outlet As illustrated in FIGS. 1-4, in one embodiment of the present invention, a dual mode nitrogen pump system 100 mechanically comprises a heavy duty tractor trailer tractor with a diesel engine 101 and an automatic transmission 102. The tractor may comprise a chassis with a sleeper cab, and a triple rear axle (not shown). These may be incorporated into a heavy duty tractor trailer tractor, such as a Class 8 truck. The engine 101 may be a 600 HP Detroit Diesel. The pumping equipment may be connected to the engine 101 through an Allison 4700OFS automatic transmission 102. The use of an automatic transmission 102 such as this, in a Class 8 truck as described herein is new to the industry.

The automatic transmission 102 may then pass power through a gearbox/transfer case 105. A switch 103 in the cab of the truck may transfer the drive train torque from the drive wheels 104 in the rear of the truck to the transfer case 105. This switch 103 may be manually operated.

In one embodiment of the present invention, the pumping equipment comprises a liquid nitrogen tank 301 that may feed a small centrifugal "boost" pump 302. This tank 301 may be of any practical size, such as 1800-gallon. This boost pump 302 may provide flow and pressure up to approximately 100 psig. The flow from the boost pump 302 may then travel to a high pressure pump 107. The high pressure pump 107 may be a reciprocating triplex pump 107 that may provide pressure up to 10,000 psig and flowrates up to 11,000 scfm.

From the reciprocating pump 107, the liquid nitrogen stream splits into one of three different options. The liquid nitrogen stream may flow directly to the customer 308 (in the case of a liquid-only customer) or to one of two different vaporizers—a diesel-fired vaporizer 309, or a waste heat recovery vaporizer 311 (whereby the waste heat from the truck in the form of exhaust, hydraulic oil, and engine coolant is used to vaporize nitrogen). From the vaporizer 309, 311 outlet, the vaporized nitrogen may travel to one of 2 possible outlets: 1 for ambient temperatures 314, and 1 for very hot or very cold temperatures 314. Around each vaporizer 309, 311 a bypass "tempering line" 319, 312 may be provided, to allow a flow of liquid nitrogen to adjust the outlet to a desired temperature.

The transfer case 105 may have 2 outlets—one direct drive connection to the triplex pump 107 and one connection to a hydraulic pump 106. The fan for the vaporizer and the boost pump (not shown) may be operated by hydraulic-drive motors. The system may be controlled by a programmable logic controller (PLC) 307, such as an Allen Bradley PLC with an associated touch screen which reads process variables and reacts accordingly.

The system 300 may require a supply of liquid transports to support it. An on-board tank 301 is maintained at approximately 10-15 psig, while transports (not shown) typically are maintained at 35 psig, and the on-board tank may be pressure-fed from the attached transport. The flow into the on-board tank 301 from the transport is normally controlled with a manual valve. In one embodiment of the present invention, the on-board tank level is controlled with an automatic valve. The pressure on the tank may be controlled by a simple vent valve, which is usually manual, but again, may be automatic.

Figure 4:
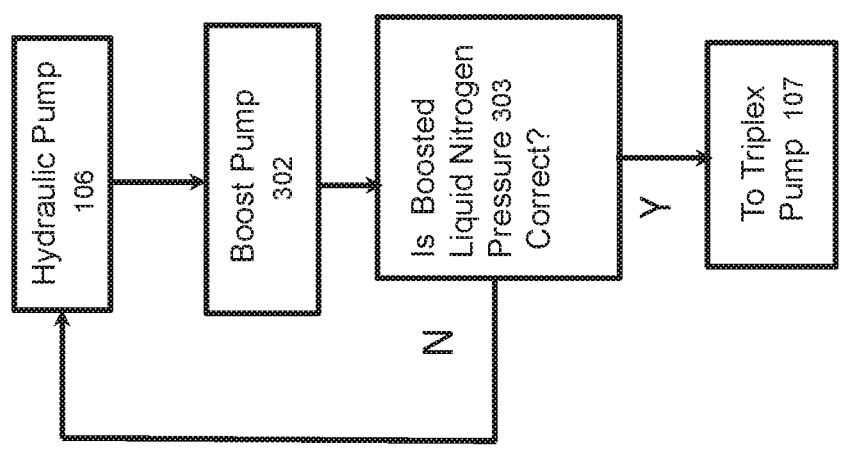
FIG. 4 illustrates the boost pump outlet pressure control scheme, in accordance with one embodiment of the present invention.

The boost pump 302 hydraulic control may be manual—the operator simply adjusts the hydraulic pressure to the pump motor, which results in the pump rotating faster and providing higher discharge pressure. As indicated in FIG. 4, in one embodiment of the present invention, the discharge pressure is automatically controlled by reading discharge pressure 303 of the pump 302 and adjusting flow from the hydraulic pump 106.

The triplex pump 107 may be controlled directly by the engine 101 and as such, flow and pressure are governed by the engine speed 201.

The high pressure liquid nitrogen flow may be calculated by measuring the speed of the input shaft to the triplex pump 107 and multiplying by a predetermined factor. The engine speed 201 may be controlled directly by the PLC 307 when pumping, which allows (due to the automatic transmission 102) complete flow control over the entire operating range.

Engine speed 201 control may also take into account the pump discharge pressure and the customer injection pressure. The customer injection pressure may be measured by 4 (or more) pressure transmitters (not shown) (at least 2 each at 2 different pressure ranges) and may be governed by 1 out of 2 voting.

Figure 2:
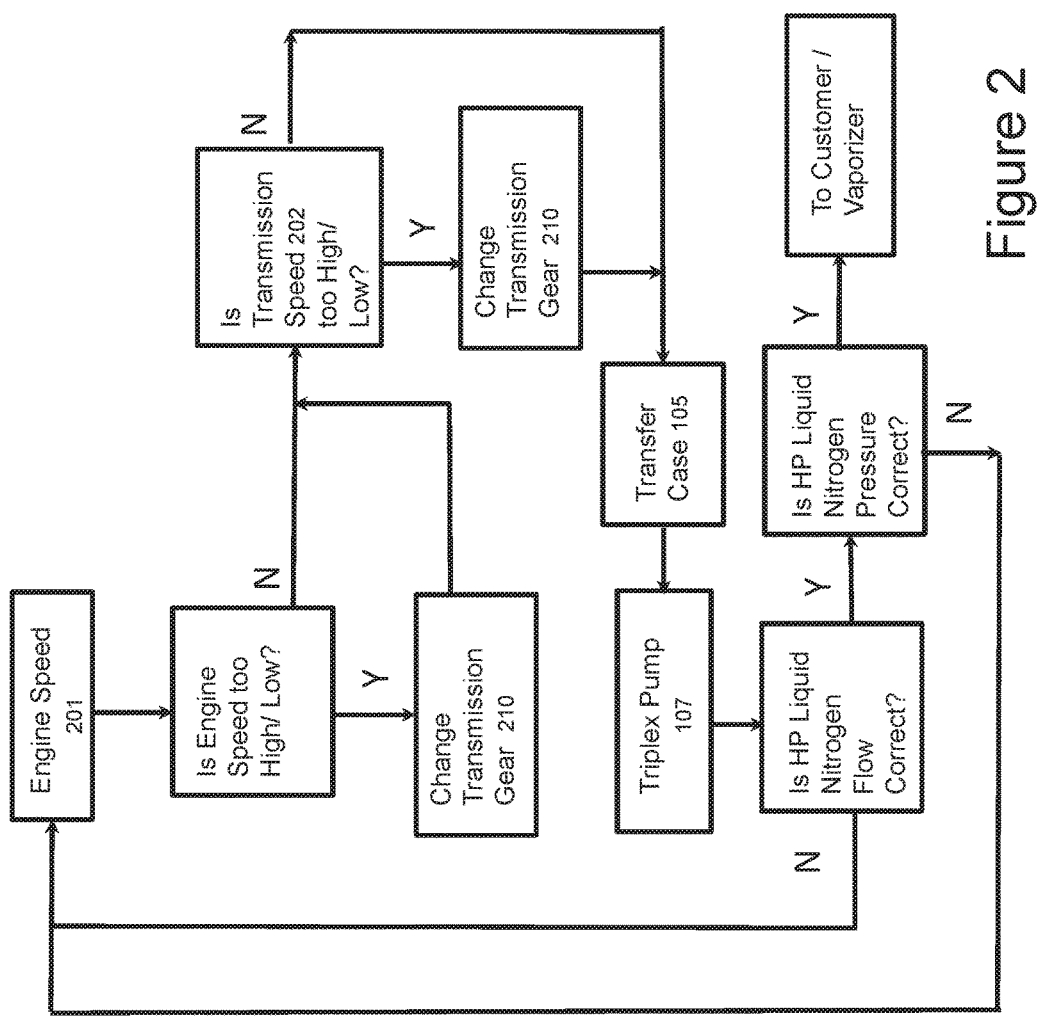
FIG. 2 illustrates the triplex pump outlet pressure and/or flow rate control scheme, in accordance with one embodiment of the present invention.
Figure 3:
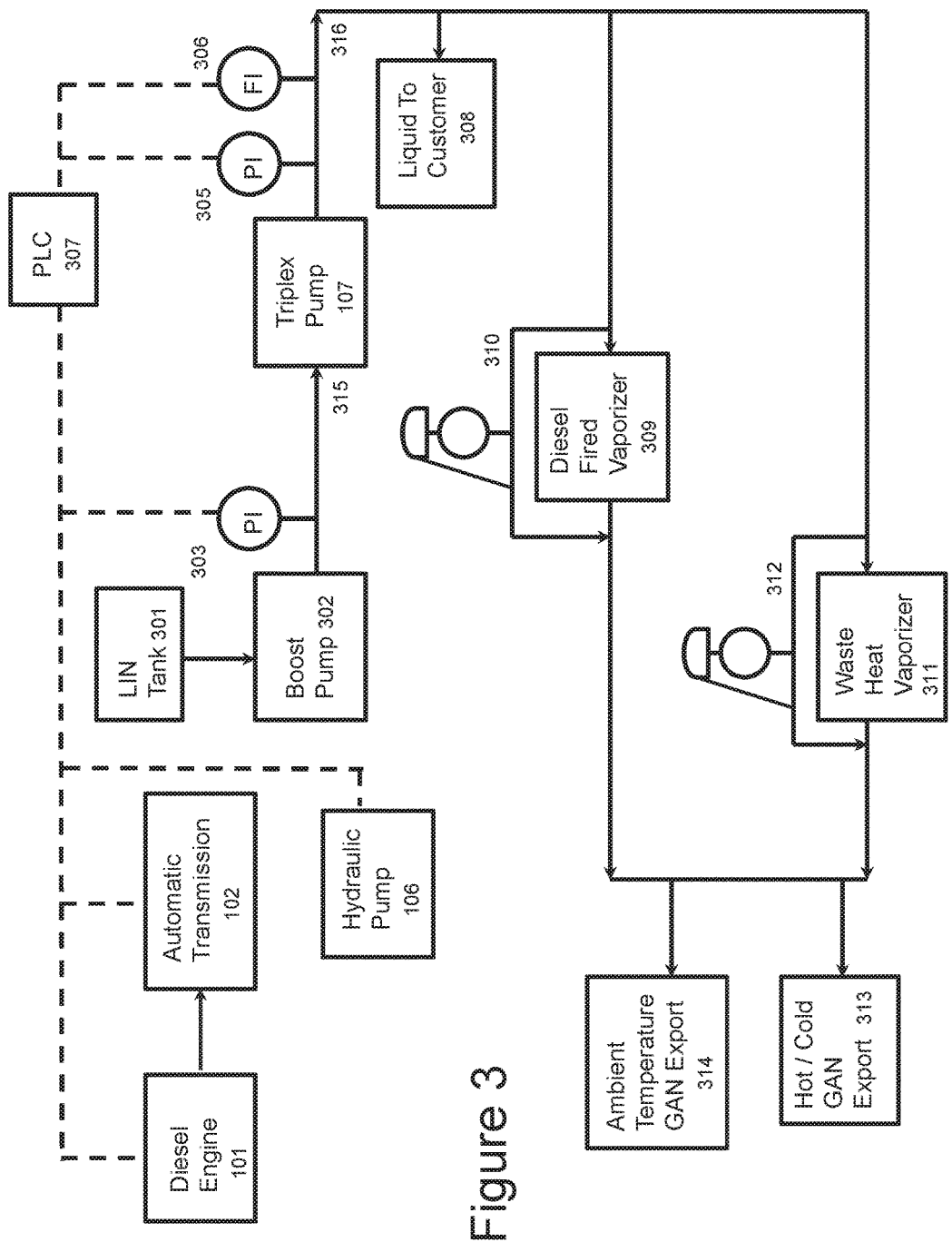
FIG. 3 illustrates a more detailed view of the overall scheme, in accordance with one embodiment of the present invention.

Referring to FIG. 2, the engine speed 201 and the subsequent automatic transmission output speed 202 are directly input into the triplex pump 107 by means of the transfer case 105. A flow indicator (FI) 306 on the outlet of the triplex pump 107 measures the HP liquid nitrogen flow. If this flow is not correct, i.e. if it is too low or too high, the PLC 307 increases or decreases the engine speed 201 as necessary. If the resulting engine speed 201 is too high, the PLC 307 changes the automatic transmission 102 to a higher gear 210. If the resulting engine speed 201 is too low, the PLC 307 changes the automatic transmission 102 to a lower gear 210. If the resulting transmission speed 202 is too high or too low, the PLC 307 increases or decreases the gear selection 210 within the transmission accordingly. Once the PLC 307 has adjusted the engine speed 201 and transmission gear selection 210, the power is then transmitted to the triplex pump 107.

Simultaneously, a pressure indicator (PI) 305 on the outlet of the triplex pump 107 measures the HP liquid nitrogen pressure. As described above, if this pressure is not correct, i.e. if it is too low or too high, the PLC 307 increases or decreases the engine speed 201 as necessary. If the resulting engine speed 201 is too high, the PLC 307 changes the automatic transmission 102 to a higher gear 210. If the resulting engine speed 201 is too low, the PLC 307 changes the automatic transmission 102 to a lower gear 210. If the resulting transmission speed 202 is too high or too low, the PLC 307 increases or decreases the gear selection 210 within the transmission accordingly. Once the PLC 307 has adjusted the engine speed 201 and transmission gear selection 210, the power is then transmitted to the triplex pump 107.

In order to avoid having the demands of having both pressure and flow rate create a dynamically unstable control condition, a low-select control scheme is implemented. Under this scheme, once either the proper pressure or the flow rate is achieved, the system maintains that operating condition. The HP liquid nitrogen pressure is then sent entire directly to the customer or to the vaporizers.

A diesel-fired heater may operate on a system wherein the air flow is ratioed to the fuel flow and is controlled by a PLC (which may be a separate PLC from the one described above). The fuel flow may be manually controlled based on nitrogen flow, with a minimum flow for a given flowrate. If the desired temperature requires fuel flow higher than minimum, the fuel flow (and subsequently the air flow) is simply increased. In one embodiment of the present invention, the minimum flow curve is programmed into the PLC and the fuel flow is ratioed off the nitrogen flow.

For lower temperatures, the minimum fuel flow applies, and the tempering valve 310 is opened to pass liquid nitrogen past the vaporizer 309 and lower the discharge temperature. This again, is controlled automatically by the PLC. Temperature may be measured at the outlet of the unit, and may also be measured at the customer injection point.

As mentioned above, all power for the truck may be supplied through the Detroit Diesel drive engine 101, and is then fed through an Allison 4700OFS automatic transmission 102. The automatic transmission 102 may be computer operated and have different operational modes including Full Automatic (wherein the unit will shift itself based on torque and speed) and Power Shift (user-directed push button shift). If the power shift mode is used, the shifter may be controlled by the PLC 307. The PLC 307 reads the speed of the transmission 102 directly from the transmission 102 and shifts up and down based on speed.

With this system, the engine speed 201 can be adjusted based on flow or pressure across the full operating range of the unit, and the transmission 201 will shift accordingly—this allows complete automatic control of the pumping unit and equipment.

A method of pumping a liquid with a vehicle tank truck is provided. This method comprises a diesel engine 101, an automatic transmission device 102, and a triplex pump 107. Power may be transferred from the diesel engine 101 through the automatic transmission device 102 to the triplex pump 107. The triplex pump 107 has a fluid provided to an inlet 315, a fluid outlet pressure 305 and a fluid outlet flow rate 306. The diesel engine 101 has an output rotational speed 202, and the automatic transmission 102 has an output rotational speed 202, and has multiple gear ratios 210.

The method comprises determining a delta P by comparing the fluid outlet pressure of the triplex pump 315 to a desired or predetermined pressure P. Then determining a delta F by comparing the fluid outlet flow rate 306 of the triplex pump 315 to a predetermined flow rate F. Then adjusting the rotational speed 201 of the diesel engine 101 to reduce the delta P and delta F, wherein the rotational speed 201 of the diesel engine 101 is held constant once either the delta P or the Delta F is approximately zero. The method comprises increasing the gear ratio 201 of the automatic transmission 102 if the rational speed 101 of the diesel engine 101 reaches a predetermined maximum speed $RPM_{max}$, and decreasing the gear ratio 201 of the automatic transmission 102 if the rotational speed 201 of the diesel engine 101 reaches a predetermined minimum $RPM_{min}$. The fluid may be liquid nitrogen. The liquid nitrogen may be provided by a storage tank 301. The storage tank 301 may be mounted on a separate truck, not shown.

A method for producing vaporized nitrogen from a liquid nitrogen vehicle tank truck is provided. This method utilizes the method previously discussed of pumping a liquid with a vehicle tank truck. This method comprises providing the pressurized liquid nitrogen stream 316 to at least one of the following: a downstream liquid nitrogen customer 308, a diesel fired vaporizer 309, and a waste heat vaporizer 311. This method may include a manual selector 103, for providing power to the transfer case 105 when the manual selector is in a first position A, and providing power to a set of drive wheels 104 when the manual selector is in a second position B. When in the first position A, the transfer case 105 may provide power from the automatic transmission 102 device to the triplex pump 107.

The method may be configured for providing power to the triplex pump 107 from a first power outlet C, and providing power to a hydraulic pump 106 from a second power outlet D. The pressurized liquid nitrogen stream 316 may produce a vaporized nitrogen stream 317,318 upon exiting the fired vaporizer 309 or the waste heat vaporizer 311.

The vaporized nitrogen 317, 318 may be at approximately ambient temperature 314. The vaporized nitrogen 317, 318 may be at a temperature of between 32 degrees F. and 100 degrees F., preferably between 60 degrees f and 80 degrees F.

The vaporized nitrogen 317, 318 may be at less than ambient temperature 313. The vaporized nitrogen 317, 318 may be at temperature of between 32 degrees F. and −320 degrees F., preferably between −238 degrees F. and −320 degrees F.

The vaporized nitrogen 317, 318 may be at greater than ambient temperature 313. The vaporized nitrogen 317, 318 may be at a temperature of between 100 degrees F. and 700 degrees F., preferably a temperature of between 250 degrees F. and 650 degrees F.

The vaporized nitrogen stream 317, 318 may have a flow rate of between 2,000 and 10,000 scfm. The vaporized nitrogen stream 317, 318 may have a flow rate of less than 11,000 scfm. The vaporized nitrogen 317, 318 may have a pressure of between 2000 and 10,000 psig.

What is claimed is:

1. A method of pumping a liquid with a vehicle tank truck, comprising; a diesel engine, an automatic transmission device, and a triplex pump, wherein power is transferred from the diesel engine through the automatic transmission device to the triplex pump, wherein the triplex pump has a fluid provided to an inlet, an fluid outlet pressure and a fluid outlet flow rate, the diesel engine has a rotational speed, and the automatic transmission device has multiple gear ratios capable of varying the rotational speed of the triplex pump with respect to the rotational speed of the diesel engine, the method comprising:

determining a delta P by comparing the fluid outlet pressure of the triplex pump to a predetermined pressure, determining a delta F by comparing the fluid outlet flow rate of the triplex pump to a predetermined flow rate, adjusting the rotational speed of the diesel engine to reduce the delta P and delta F, wherein the rotational speed of the diesel engine is held constant once either the delta P or the Delta F is zero, and increasing the gear ratio of the automatic transmission device if the rotational speed of the diesel engine reaches a predetermined maximum, and decreasing the gear ratio of the automatic transmission device if the rotational speed of the diesel engine reaches a predetermined minimum.

2. The method of claim 1, wherein the fluid is liquid nitrogen.

3. A method for producing vaporized nitrogen from a liquid nitrogen vehicle tank truck utilizing the method of claim 1, wherein the fluid is liquid nitrogen, the method comprising:

introducing the liquid nitrogen into said triplex pump, thereby producing a pressurized liquid nitrogen stream, providing the pressurized liquid nitrogen stream to at least one of the following:

a downstream liquid nitrogen customer, a fired vaporizer, and a waste heat vaporizer.

4. The method of claim 3, further comprising a manual selector, for providing power to a transfer case when the manual selector is in a first position, and providing power to a set of drive wheels when the manual selector is in a second position, wherein, when in the first position, the transfer case provides power from the automatic transmission device to the triplex pump.

5. The method of claim 4, wherein the transfer case is configured for:

providing power to the triplex pump from a first power outlet, and providing power to a hydraulic pump from a second power outlet.

6. The method of claim 3, wherein the liquid nitrogen is provided by a storage tank.

7. The method of claim 6, wherein the storage tank is mounted on a separate truck.

* * * * *